Jan. 12, 1960

W. F. KNABE 2,920,773

ENGINE POSITIONING DOLLY

Filed June 7, 1957

INVENTOR.
W. F. KNABE

BY S. Tierney Jr
ATTORNEY

INVENTOR.
W. F. KNABE
BY
S. Tierney, Jr
ATTORNEY

Jan. 12, 1960  W. F. KNABE  2,920,773
ENGINE POSITIONING DOLLY
Filed June 7, 1957  4 Sheets-Sheet 4

INVENTOR.
W. F. KNABE
BY
S. Tierney, Jr
ATTORNEY

2,920,773

ENGINE POSITIONING DOLLY

William F. Knabe, Colton, Calif., assignor to Rohr Aircraft Corporation, Chula Vista, Calif., a corporation of California Application June 7, 1957, Serial No. 664,412

13 Claims. (Cl. 214—1)

This invention relates to a dolly capable of transporting a long heavy article such as a jet engine, torpedo, bomb or other bulky article to be installed on an airplane to the airplane and raising the article to a level at which it can be secured in place on the plane. It is accordingly an object of the invention to provide such a dolly with pneumatic tires so that the engine may be easily transported along a floor, field or highway to the airplane and then installed.

A further object is to provide a buck to which the engine is attached and provide means on the dolly capable of raising the buck and engine together to a desired level.

Another object is to provide at one end of the dolly a bracing member which can be readily detached to provide room for the entrance of the buck and engine into the dolly. In the preferred form of the invention, the engine buck has wheels which roll along the floor to accomplish the easy transport of the engine into the dolly.

A further object is to provide means on the dolly for tilting the engine in any direction through any desired small angle after it has been elevated to a desired level.

Another object is to provide on the dolly a plurality of adjustable members capable of moving the engine in the direction of its axis and/or in a direction transverse thereto to bring the engine into a predetermined position with reference to the parts of the airframe to which it is to be connected by bolts or other detachable securing means.

Further objects will become apparent as the description of my novel dolly proceeds. For a better understanding of the invention reference is made to the accompanying drawings, in which.

Figure 1:
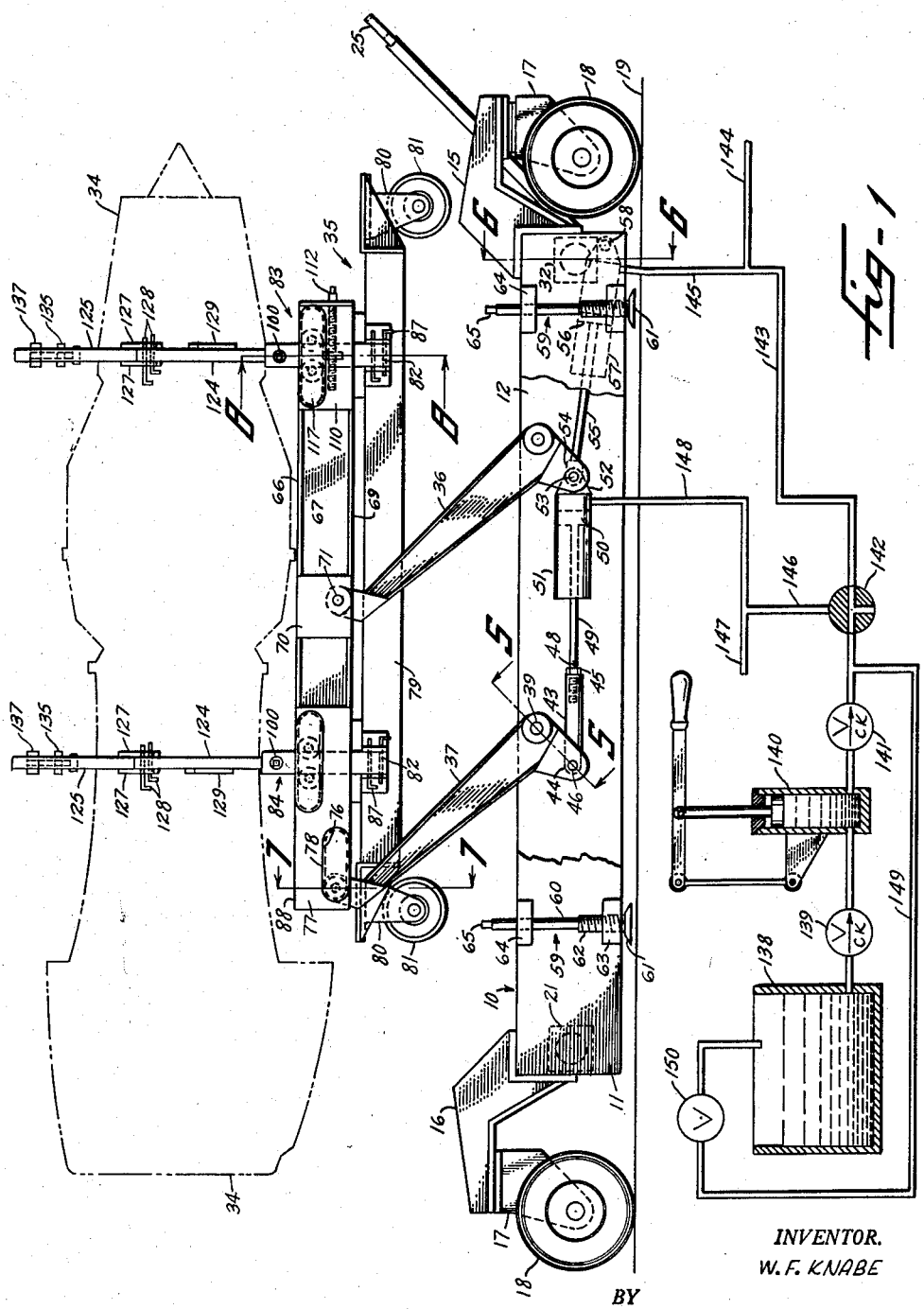
Fig. 1 is a front view of an engine dolly embodying the invention; an engine on a buck also showing partly diagrammatically a hydraulic actuating system.
Figure 3:
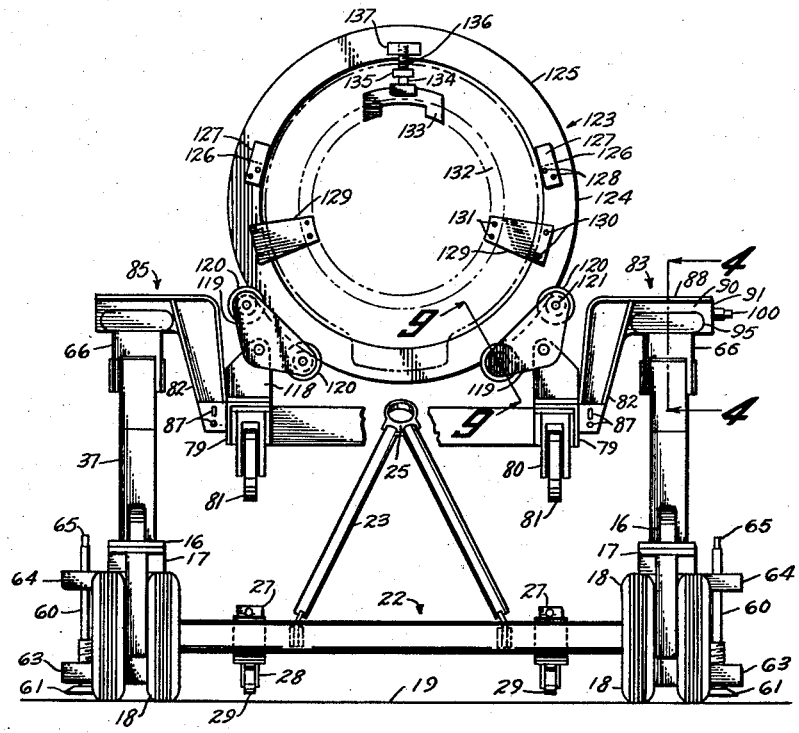
Fig. 3 is an end view of the dolly, engine and buck taken from the left of Fig. 2 with parts omitted for clarity.
Figure 7:
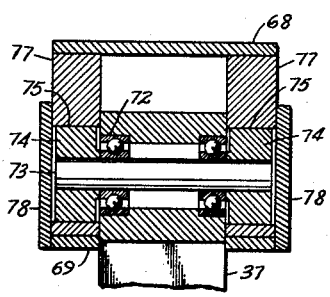
Figure 8:
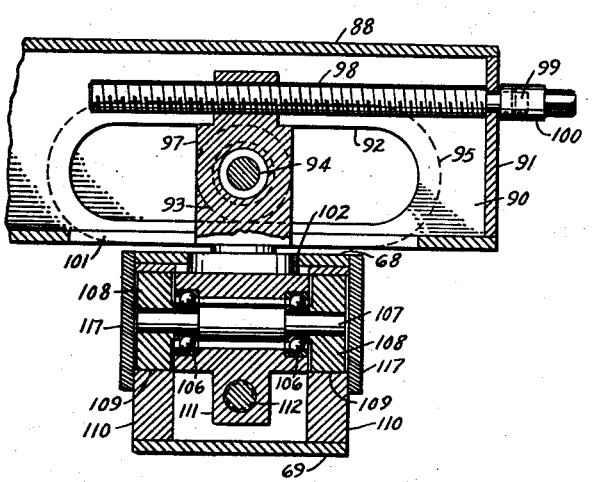
Figure 9:
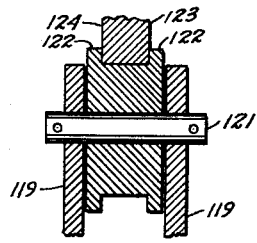

Fig. 7 is a section taken on line 7—7 of Fig. 1 showing a portion of the dolly on an enlarged scale, Fig. 8 is a section taken on line 8—8 of Fig. 1 showing a portion of the dolly on an enlarged scale and, Fig. 9 is a section of a ring attached to the engine and one of its supporting rollers taken on line 9—9 of Fig. 3.

The dolly comprises a main supporting frame 10 composed of two similar hollow beams 11 made of metal plates welded together, the vertical plates 12, 13 (Figs. 1, 2 and 5) being spaced well apart to provide a long opening 14 within which certain operating mechanism to be described is located. A pair of brackets 15, 16 are welded to the ends of each beam 11, each bracket pivotally supporting for rotation about a vertical axis by any known means a caster 17 which pivotally supports a pair of wheels having pneumatic tires 18 adapted to roll along floor 19. The rear ends of beams 11 are held a predetermined distance apart by a crossbar 20 whose enlarged ends 21 are welded to the beams and the front ends of the beams are held the same distance apart by a detachable axle 22. A pull bar or handle 23 is connected by pivots 24 to axle 22, the bar having at its front end an eye 25. Axle 22 comprises a tube 26 (see Fig. 6) near each end of which a clamp 27 is connected, the bottom of the clamp having a bracket 28 attached thereto. Brackets 28 carry pivotally supported rollers 29 (see Fig. 3) which normally clear the floor 19. To each end of tube 26 (see Figs. 2 and 6) a pair of spaced apart plates 30 are welded, these plates passing between three projecting lugs 31 on a bracket 32 which is welded to plate 13 of beam 11. Plates 30 and lugs 31 are drilled to receive a pair of securing pins 33.

Figure 5:
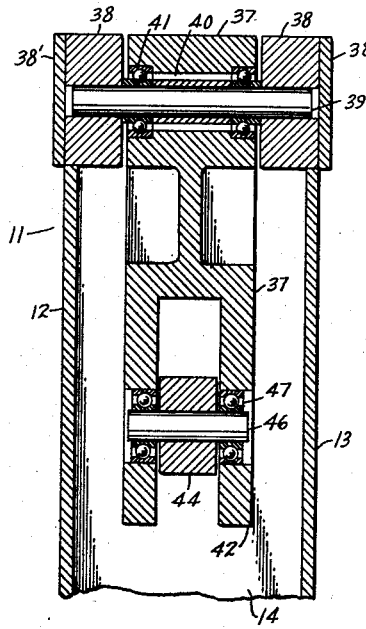
Fig. 5 is a section taken on line 5—5 of Fig. 1 showing a portion of the dolly on an enlarged scale.
Figure 6:
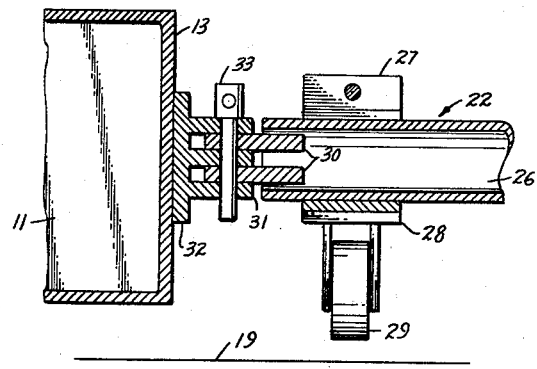
Fig. 6 is a section taken on line 6—6 of Fig. 1 showing a portion of the dolly on an enlarged scale.

The jet engine 34 is mounted on a supporting buck 35 which is supported by two aligned front levers 36 and two aligned rear levers 37. As shown in Figs. 1 and 5, each lever is pivotally supported on beam 11 by two circular bosses receiving the ends of a pin 39. The lever has a bore 40 to receive a ball bearing 41 whose inner race is seated on pin 39 so that the lower end 42 of each lever depends into beam opening 14. The lower ends of levers 36, 37 are connected together by an actuating linkage which comprises a tube 43 having solid end closures 44, 45, closure 44 (Fig. 5) having a bore to receive a pin 46 which is pivotally supported by ball bearings 47 disposed in a bore in end 42 of lever 37. Closure 45 is threaded to receive a long screw 48 formed on one end of piston rod 49 to the other end of which is attached a piston 50 slidable in a cylinder 51. An extension 52 on cylinder 51 is pivotally connected to the lower end of lever 36 by pin 53 which also passes through a fitting 54 attached to the rear end of a second piston rod 55. Piston rod 55 is actuated by a piston 56 slidable in cylinder 57 whose front end is pivotally supported on a pin 58 carried by beam 11. Cylindrical closure discs 38' (Fig. 5) may be welded to bosses 38 to protect bearing 41 from the entry of dirt or other foreign matter.

Figure 2:
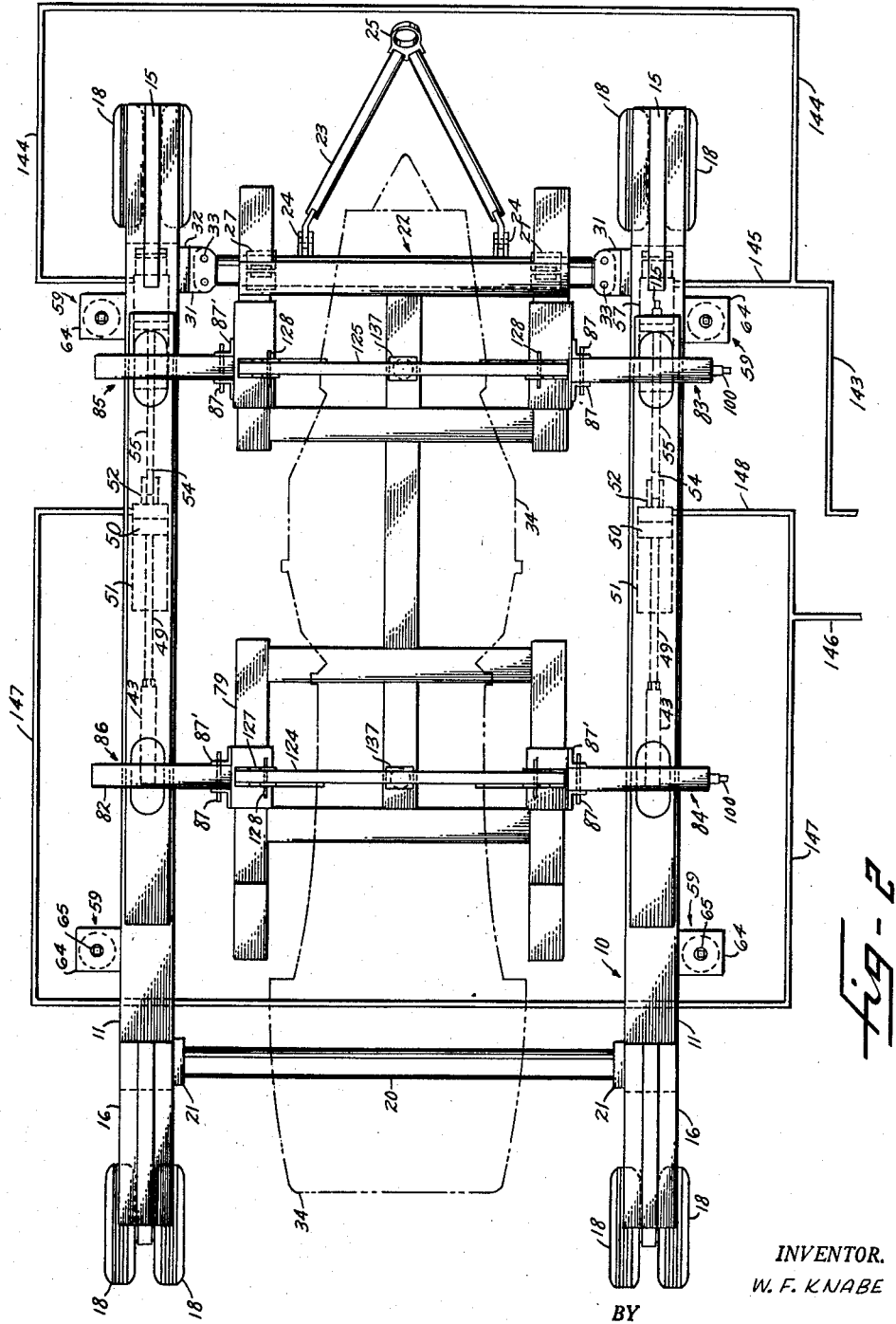
Fig. 2 is a top view of the dolly of Fig. 1 with certain parts omitted for clarity and also parts of the hydraulic system.

In order to lift and level the assembly and take a major portion of its weight off tires 18, four similar screw jacks 59 are provided, each comprising a long threaded rod 60 to the bottom of which a pad 61 is attached. Rod 60 is threaded in a bushing 62 which is attached to a metal plate 63 welded to the outer face of plate 11 and projecting out therefrom (Figs. 1 and 2). The upper end of rod 60 passes through a guide plate 64 also welded to plate 11 and the top 65 of rod 60 is square to receive a socket wrench (not shown). It will be clear that by rotating the rods 60 successively by a socket wrench, the pads 61 may be advanced against floor 19 and the beams 11 raised and leveled to take the weight partly or entirely off tires 18. It is also clear that if the floor 19 is not level, the tops of both beams 11 may nevertheless be brought into the same horizontal plane by suitable adjustment of rods 60 and pads 61.

Above the beams 11 a pair of similar beams 66 are supported at the tops of levers 36, 37, each beam having for a portion of its length a central vertical web 67, and top and bottom flanges 68, 69. A pair of vertical plates 70 (only one being shown), Fig. 1, connect the flanges near the center of the beam and the top of lever 36 extends up between these plates and a pivot pin 71 passes through the plates and the top of the lever. The top of each lever 37 is connected to the rear end of beam 66 in the following manner. The top of the lever is bored (Figs. 1 and 7) to receive a ball bearing 72 through which passes a pin 73 to the ends of which are attached a pair of rollers 74. Each roller engages the marginal wall 75 of a long horizontal slot 76 cut in a vertical plate 77 which is welded to the beam flanges 68—69. Cover plates 78 may be detachably connected to the outer faces of plates 77 to cover the slots 76 and prevent the entrance of foreign matter.

Figure 4:
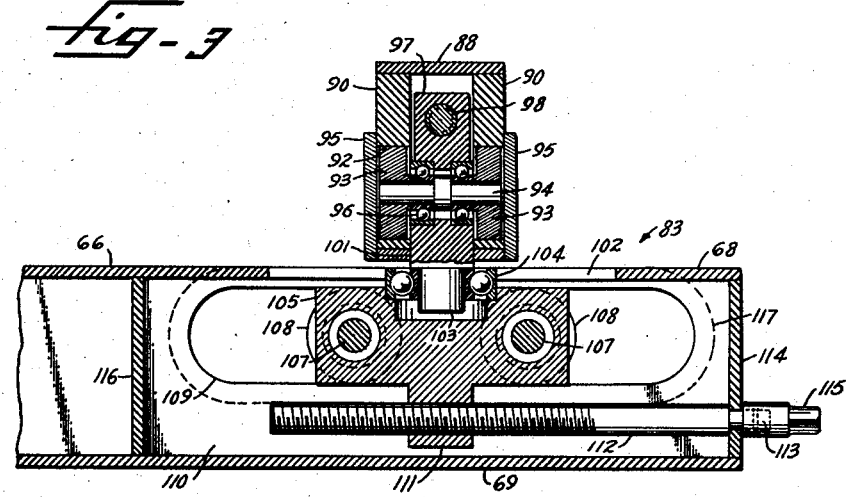
Fig. 4 is a cross section taken on line 4—4 of Figs. 3 and 8 showing a portion of the dolly on an enlarged scale.

Buck 35 (Figs. 1 and 2) which supports the engine has a pair of parallel long beams 79 to the ends of which casters 80 are pivotally connected, each caster having a wheel 81 of substantially smaller diameter than the tires 18. Beams 79 are detachably connected to legs 82 which depend from four generally similar supports 83, 84, 85 and 86 by two pins 87 (Figs. 2 and 3) which pass through brackets 87' attached to the beams. Support 83 comprises a hollow horizontal portion integral with leg 82 (Figs. 3, 4 and 8), this portion having top and bottom walls 88, 89; side walls 90 and vertical end wall 91. Side walls 90 have long slots 92 whose marginal walls are in contact with a pair of rollers 93 secured to the ends of a pin 94. A pair of cover plates 95 may be secured to walls 90 to cover slots 92 and prevent the entry of foreign matter. Pin 94 is journalled in ball bearings 96 set into a block 97 whose upper end is threaded to receive screw 98. The end 99 of the screw is of reduced diameter and passes through a hole in plate 91, a socket 100 adapted to be rotated by a wrench being secured to outer end 99. Block 97 extends down through a long slot 101 in wall 89 and also through a long slot 102 in beam flange 68, the latter slot normally extending perpendicular to slot 101. The bottom 103 of block 97 is cylindrical and supported for oscillation about a vertical axis by a ball bearing 104 which is seated in a recess provided in a carriage 105. Carriage 105 contains ball bearings 106 which rotatably support two shafts 107 to the ends of each of which a pair of rollers 108 are attached. These rollers move along two long tracks 109 provided in a pair of vertical plates 110 welded to the edges of beam flanges 68—69. Carriage 105 has a depending lug 111 which is threaded to receive a long screw 112 whose outer end 113 is of reduced diameter and passes through a plate 114 secured to the end of flanges 68—69. A socket 115 adapted to be rotated by a wrench may be secured to the end of adjusting screw 112. A stiffening plate 116 may extend across beam 66 and be welded to flanges 68, 69. The openings in plates 110 within which the rollers 108 move may be closed by a pair of covers 117. From the above it will be clear that rotation of socket 100 and screw 98 in one direction will advance leg 82 of buck support 83 toward engine 34 and rotation in the opposite direction will withdraw it away from the engine. It is also clear that rotation of socket 115 and screw 112 in one direction will advance leg 82 of support 83 toward the rear (left) in Fig. 2 and rotation in the opposite direction will advance the leg toward the right or front.

Referring to Figs. 1, 2 and 3, four upstanding brackets 118 are secured to beams 79, each bracket carrying a pair of spaced apart plates 119 between which two rollers 120 are rotatably supported on pivot pins 121 (Fig. 9). Each roller has a pair of end flanges 122 between which an engine supporting ring 123 is received. Each ring is preferably composed of lower and upper mating segments 124, 125, which abut together at 126. Welded to each end of segment 125 are a pair of plates 127 between which an upper end of segment 124 extends. The segments may be secured together by a pair of pins 128 which pass through aligned holes in segment 124 and plates 127. Engine 34 is secured to segment 124 by means of two radially extending plates 129 which are detachably secured to the segment by two pins 130 which pass through aligned holes in the segment and each plate and by two pins 131 which pass through plate 129 into two holes in the peripheral portion 132 of the engine. At its top the peripheral portion of the engine is grasped by a pair of clamps 133, each clamp (Fig. 3) being attached to a thrust collar 134 against which the lower end of the knurled head 135 of a rotatable screw 136 bears. The upper end of the screw has threaded engagement in a boss 137 attached to upper ring segment 125. Buck support 84 is of the same construction as support 83 except that adjusting screw 112 is omitted so that its carriage 105 is free to move back and forth on tracks 109, being supported by its rollers 108. Buck supports 85 and 86 are of the same construction as support 83 except that both the adjusting screws 98 and 112 are omitted therefrom.

Pressurized oil or other suitable liquid to raise the engine is supplied from a tank 138 (Figs. 1 and 2) via check valve 139 to a hand operated pump 140 whose outlet is connected via check valve 141 to an adjustable valve 142. A pipe 143 having two branches 144, 145 connects valve 142 to the front ends of both cylinders 57. A pipe 146 having two branches 147, 148 which terminate in the front ends of both cylinders 51 also connects to valve 142. A return line 149 connects the outlet of check valve 141 to a valve 150 which, when open, discharges fluid into tank 138.

*Operation*

To raise an engine mounted on its buck 35 to a position where it can be secured by bolts or pins to an airframe (not shown) the following steps may be followed:

(1) Axle 22 is removed from the dolly by removing pins 33 (Figs. 1 and 2) and pulling forward on handle 23, the wheels 29 rolling along floor 19 and supporting the axle.

(2) Buck 35 with engine 34 thereon is rolled into place and moved rearward between the casters 17 to approximately the position where it can be attached to the dolly.

(3) The four screws 60 are rotated by a wrench to advance the pads 61 against floor 19 and take most of the weight off tires 18. If the floor is not level, one or more of the screws may be further rotated to make the beams 11 level and bring their top faces into the same horizontal plane.

(4) Manually move legs 82 of supports 85 and 86 toward the engine until pins 87 can be inserted in the holes in the legs and brackets 87'.

(5) Move carriage 105 of support 84 until its leg 82 is aligned with adjacent brackets 87' then rotate screw 98 of support 84 to advance leg 82 toward engine until pins 87 can be inserted in the holes in the leg and brackets.

(6) Rotate screw 112 of support 83 to advance its leg 82 into the proper plane then rotate its screw 98 to advance the leg between the adjacent brackets 87' and insert the pins 87. The engine buck is now connected to the dolly at two spaced apart places on each side.

(7) With valve 150 closed and valve 142 set in the position shown in Fig. 1, pump 140 is operated to force pressurized liquid into cylinders 57. This causes their pistons 56 to move rearwardly and rock levers 36 and 37 about their pivots 39. The tops of the levers move up and the pumping is continued until the engine is somewhat below its desired position in the airplane. If it is not in the proper angular position, it can be manually rotated about its longitudinal axis to bring it to the desired position. During this rotation, the engine is supported by the two rings 123 which have rolling contact with rollers 120.

(8) The two wheel segments 125 are now removed by withdrawing the eight pins 128 and lifting the segments off.

(9) The operation of pump 140 is resumed until the front end of the engine is at the correct height for attachment to the airframe. If the front end requires a small sidewise adjustment this is made by rotating screw 98 of support 83. If a small longitudinal adjustment is required, this is effected by rotating screw 112.

(10) If the rear end of the engine is too low to permit its attachment to the airframe, it is tilted up by setting valve 142 so that it connects check valve 141 to pipe 146. Pump 140 is then operated to supply pressurized fluid to cylinders 51 causing their pistons 50 to move rearward and raise the rear end of the engine to the proper height.

(11) If the rear end of the engine is off to one side of the position required for its attachment (by bolts or pins, not shown) to the airframe, it is moved sidewise by rotating screw 98 of support 84 in the proper direction. The engine is now secured to the airframe by inserting the bolts.

(12) If the engine has accessories which the plates 129 would strike against as the buck 35 is lowered, these plates are removed by withdrawing the pins 130 and 131.

(13) Valve 142 is reset to the position shown in Fig. 1 and the valve 150 slowly opened. This permits the pressurized fluid to leave cylinders 57 and to return to tank 138 via pipes 143 and 149. As pistons 56 move forwardly under the weight of buck 35 the upper ends of levers 36, 37 move rearwardly from the position shown in Fig. 1 and lower the buck until its wheels 81 rest on floor 19.

While pump 140 has been illustrated as being manually operated, it will be understood that any type of power driven pump may be used instead.

This invention may be embodied in other forms or carried out in other ways without departing from the spirit or essential characteristics thereof. The present embodiment of the invention is therefore to be considered as in all respects illustrative and not restrictive, the scope of the invention being indicated by the appended claims, and all changes which come within the meaning and range of equivalency of the claims are intended to be embraced therein.

Having thus described my invention, what I claim as new and useful and desire to secure by Letters Patent is:

1. Means for supporting a long article and raising the article to a desired position under an airframe comprising, in combination; a dolly comprising a pair of long substantially parallel beams; a pair of spaced apart levers of the first class pivotally connected to each beam; a pair of long members respectively connected to the upper ends of said levers individual to said beams; a support to which the article is attached disposed between said beams; a plurality of spaced apart members connecting said long members to said support; link means pivotally interconnecting the lower ends of said levers; and means connected to said lower ends of said levers to rock all said levers simultaneously through an angle sufficient to raise the article to the desired position.

2. Means for supporting a long article and raising the article to a desired position with reference to an airframe comprising, in combination: a pair of long substantially parallel beams; a spacing member connecting the rear ends of said beams; a first pair of levers of the first class pivotally supported by said beams for oscillation about a common axis; a second pair of levers of the first class pivotally supported by said beams for oscillation about an axis a substantial distance in front of said common axis; means connected to the lower ends of the levers of said second pair to move said lower ends through a predetermined angle; linkages whose length can be adjusted pivotally connecting the lower ends of the levers of said second pair to the lower ends of the levers of said first pair; a pair of substantially parallel members connecting the upper ends of the levers of said first pair to the upper ends of the levers of said second pair; an article support on which the article rests disposed between said parallel members; and a plurality of spaced apart legs connected to each of said parallel members and to said article support.

3. An article supporting means as claimed in claim 2, in which at least one of said parallel members is provided with means for adjusting the legs connected thereto toward the front or rear of said one member.

4. An article supporting means as claimed in claim 2, in which at least one of said parallel members is provided with means for adjusting the legs connected thereto in a direction transverse to the length of said member.

5. An article supporting means as claimed in claim 2, in which each of said adjustable linkages comprises a cylinder; a piston slidable in said cylinder; and a mass of pressurized fluid disposed in said cylinder and against one face of said piston.

6. Means for supporting and elevating a long article comprising, in combination: two spaced apart long parallel members; two aligned pivots carried by said members and immovably fixed thereto; first and second levers of the first class rotatably supported on said pivots; third and fourth aligned pivots carried by said members and immovably fixed thereto at a substantial distance from said two pivots; third and fourth levers of the first class rotatably supported by said third and fourth pivots; a beam pivotally connected to the tops of said first and third levers; a second beam substantially parallel to said first beam and pivotally connected to the tops of said second and fourth levers; a frame adapted to support the article disposed between and connected to said beams; means actuated by pressurized fluid connected to the lower ends of said third and fourth levers to rotate said third and fourth levers through a desired angle; and means actuated by pressurized fluid interconnected between the lower ends of said first and second levers and the lower ends of said third and fourth levers to rotate said first and second levers through an angle greater than said desired angle.

7. Means for supporting and elevating a long article comprising, two spaced apart long parallel members; a spacing member connected to the rear ends of said members to maintain said rear ends a desired distance apart; an axle extending between the front ends of said members; detachable means connecting the ends of said axle to said members; at least two spaced apart rollers under said axle and pivotally supported thereby; a plurality of wheels pivotally connected to said parallel members and constructed to roll along a floor and support said members and said rollers clear of the floor; a plurality of spaced apart levers of the first class pivotally connected to each of said parallel members; means connected to the lower ends of said levers to move the upper ends of the levers to a level substantially above the top of said parallel members; an article support on which the article is adapted to rest disposed between said parallel members; and means connecting said support to the upper ends of said levers.

8. An elevating means as claimed in claim 7, in which the width of said article support is less than the length of said axle whereby upon detachment of said axle from said parallel members said article support may be advanced rearwardly between said parallel members.

9. Means for elevating a long member having a substantially horizontal slot in one end thereof comprising, in combination: a support disposed under said member; first and second spaced apart levers of the first class pivoted to said support; a pivot connecting the upper end of said first lever to said member; a roller connected to the upper end of said second lever and movable along said slot; means energized by pressurized fluid connected to the lower ends of said levers for simultaneously moving said levers through a desired angle; and means energized by pressurized fluid and interconnecting said lower ends of the levers for moving said second lever through an additional angle while said first lever remains stationary.

10. Means for supporting and elevating a jet engine comprising, in combination: two spaced apart long parallel members; means connected to said members to maintain a desired spacing therebetween; supporting wheels pivotally connected to the ends of said members; pneumatic tires attached to the rims of said wheels and adapted to support said members above a floor under and in contact with said tires; a buck on which the engine rests, the width of said buck being less than the distance between said parallel members; a plurality of wheels under said buck and pivotally connected thereto whereby by rolling said last named wheels along the floor the buck and engine may be advanced to a position between said parallel members; a plurality of levers of the first class pivotally connected to said parallel members; adjustable link means pivotally interconnecting the lower ends of said levers for adjusting the angles therebetween; means connected to said lower ends of said levers to rotate the levers through a desired angle; and means connecting the upper ends of said levers to said buck to elevate said buck and engine in response to the rotation of said levers.

11. An engine elevating means as claimed in claim 10, in which the engine has spaced apart rings attached thereto in planes normal to its longitudinal axis; and said buck is provided with a plurality of supporting rollers in contact with the periphery of said rings to permit the easy rotation of the engine about its axis.

12. Means for supporting and elevating a long article comprising, in combination: two spaced apart long parallel members; two aligned pivots carried by said members; first and second levers of the first class rotatably supported on said pivots; third and fourth aligned pivots carried by said members at a substantial distance from said two pivots; third and fourth levers of the first class rotatably supported by said third and fourth pivots; a beam connected to the tops of said first and third levers; a second beam substantially parallel to said first beam connected to the tops of said second and fourth levers; a frame adapted to support the article disposed between and connected to said beams; means actuated by pressurized fluid connected to the lower ends of said third and fourth levers to rotate said third and fourth levers through a desired angle; and means actuated by pressurized fluid connected to the lower ends of said first and second levers to rotate said first and second levers through an angle greater than said desired angle, said last named means being connected to the lower ends of said third and fourth levers to interconnect said first and third levers and said second and fourth levers respectively.

13. Means for supporting and elevating a long article comprising, in combination: a rigid frame; first and second aligned levers of the first class; means immovably fixed on said frame pivotally supporting said levers near their lower ends; a pair of substantially parallel spaced apart beams; pivots carried by said beams at points remote from the ends thereof, said pivots extending into the upper ends of said levers; third and fourth aligned levers of the first class; means immovably fixed on said frame pivotally supporting said third and fourth levers near their lower ends; said beams near their rear ends having slots extending lengthwise thereof; rollers carried by the upper ends of said third and fourth levers and movable along said slots; means connected to said rigid frame and said first and second levers for rotating said first, second, third and fourth levers through a desired angle; and a pair of links each having interengaged screw threaded portions for connecting the lower ends of said first and second levers to the lower ends of said third and fourth levers respectively.

References Cited in the file of this patent

UNITED STATES PATENTS

| 477,702 | Rodenhausen | June 28, 1892 |
| 1,622,201 | Little | Mar. 22, 1927 |
| 2,123,505 | Faries | July 12, 1938 |
| 2,454,840 | Ryan | Nov. 30, 1948 |
| 2,613,822 | Stanley | Oct. 14, 1952 |
| 3,617,547 | Pridy | Nov. 11, 1952 |
| 2,712,874 | Murray | July 12, 1955 |